Jan. 22, 1924.
J. J. SCHRAG
HARROW
Filed April 14, 1923
1,481,393
2 Sheets-Sheet 2
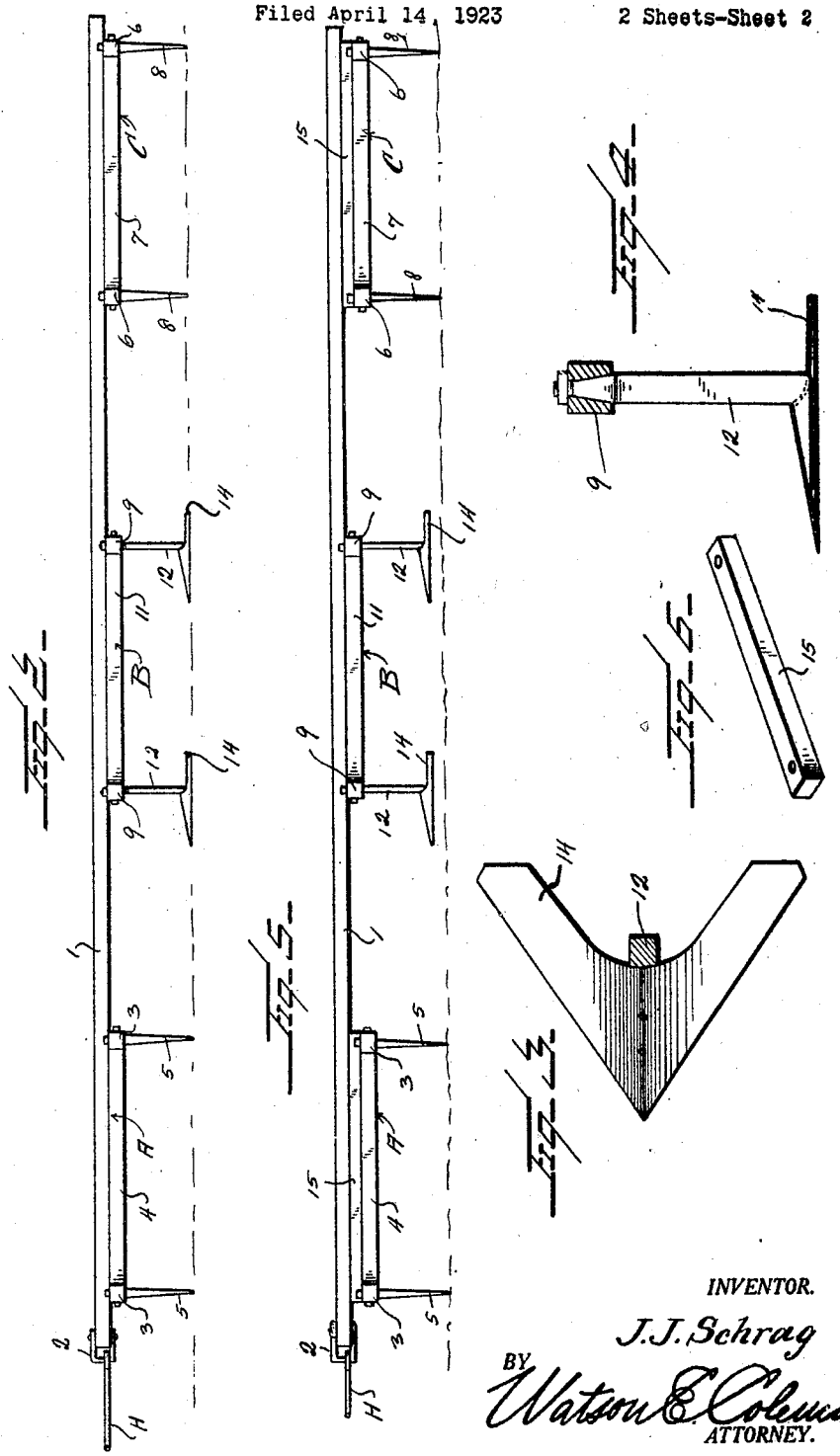
INVENTOR.
J.J. Schrag
BY Watson E. Coleman
ATTORNEY.

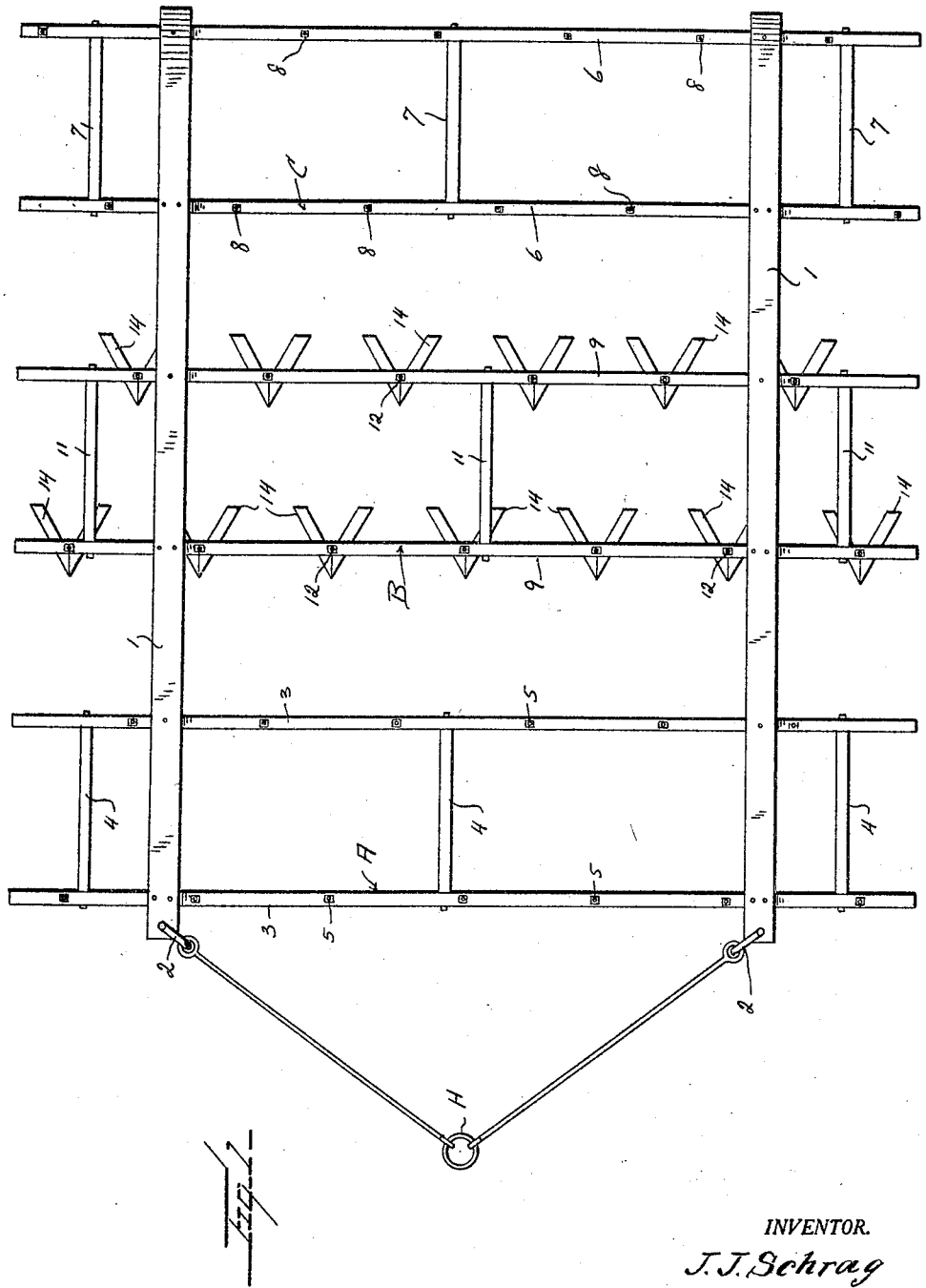

Patented Jan. 22, 1924.

1,481,393

UNITED STATES PATENT OFFICE.

JOHN J. SCHRAG, OF HARVEY, KANSAS.

HARROW.

Application filed April 14, 1923. Serial No. 632,072.

*To all whom it may concern:*

Be it known that I, JOHN J. SCHRAG, a citizen of the United States, residing in the county of Harvey and State of Kansas, have invented certain new and useful Improvements in Harrows, of which the following is a specification, reference being had to the accompanying drawings.

This invention relates to certain improvements in harrows and it is an object of the invention to provide a novel and improved device of this general character which, in addition to the conventional teeth to stir up and level the soil is also provided with hoe parts assembled in a manner to effectively destroy weeds or kindred growth in the soil being treated.

Another object of the invention is to provide a novel and improved device of this general character comprising a plurality of sections spaced apart in the same general direction as the direction of travel of the harrow when in use, an intermediate section being provided with hose positioned in a manner to effectively destroy weeds or the like.

An additional object of the invention is to provide a novel and improved device of this general character wherein is provided a plurality of hoes arranged in transversely disposed rows, the hoes in one row being in staggered relation to the hoes in the second row together with a harrow section positioned in advance of the hoes and provided with conventional teeth, each of said teeth being arranged directly in advance of a hoe in order to break a way for the hoe so that the liability of choking is eliminated.

Furthermore it is an object of the invention to provide a novel and improved harrow of this general character comprising moving members, and wherein the forward and rear portions are provided with depending teeth to maintain the harrow in substantially a level position and wherein hoes are arranged between said front and rear teeth, said teeth and hoes being so assembled to effectively treat the soil at all points between the ends of the harrow and in the manner to cut or destroy all roots in the ground.

The invention consists in the details of construction and in the combination and arrangement of the several parts of my improved harrow whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a harrow constructed in accordance with an embodiment of my invention;

Figure 2 is a view in side elevation of the device as herein disclosed;

Figure 3 is a view partly in section and partly in plan illustrating one of the hoes;

Figure 4 is a view partly in side elevation and partly in section of one of the hoes as herein disclosed;

Figure 5 is a view in side elvation illustrating a harrow constructed in accordance with a further embodiment of my invention;

Figure 6 is a view in perspective of one of the elongated members disclosed in Figure 5;

As disclosed in the accompanying drawings, my improved harrow comprises a pair of parallel spaced beams 1 of requisite dimensions and disposed in the same general direction as the direction of travel of the harrow during a working operation and the forward end portions of the beams 1 are provided with the clevis 2 or the like with which is adapted to be attached a harrow hitch H of any ordinary or preferred type.

Mounted upon and carried by the beams 1 are three harrow sections A, B and C. The forward harrow section A comprises a pair of parallel bars 3 coextensive in length and extending outwardly beyond the beams 1. The bars 3 are connected at predetermined points spaced longitudinally thereof by the brace members 4. Carried by and depending from the bars 3 are the harrow teeth 5. The teeth 5 of one bar 3 are staggered with respect to the teeth 5 of the second bar 3.

The rear harrow section C also comprises a pair of parallel bars 6 coextensive in length and extending outwardly beyond the beams 1 and with the extremities thereof substantially coplanar with the extremities of the bars 3 of the forward harrow section A. The bars 6 are connected by the brace members 7 and depending from the bars 6 are the teeth 8 of a conventional type. The teeth 8 of one bar 6 are staggered with respect to the teeth 8 of the second bar 6.

The intermediate harrow section B is positioned substantially midway of the sections A and C and comprises the bars 9 coextensive in length and also extending outwardly beyond the beams 1 with the extremities of said bars substantially coplanar with the extremities of the bars 3 and 6. The bars 9 are connected at predetermined points spaced longitudinally thereof by the braces 11. Depending from the bars 9 at predetermined points spaced longitudinally thereof are the standards 12, the standards of one bar 9 being staggered with respect to the standards of a second bar.

It is to be particularly noted that each tooth 5 of a forward harrow section A is positioned directly in advance of a shank 12 and secured to the lower end portion of each of the shanks 12 is a hoe 14 substantially horizontal when in working position. The hoe 14 is in the form of a V with its apex or point forwardly directed. In assembly the shanks 12 and the hoes 14 carried thereby are substantially coplanar or horizontally disposed so that during a working operation it is assured that the hoes penetrate the ground substantially the same extent. The major width of the hoes is also such that the two rows of such hoes substantially bridge from one end of the section B to the other whereby it is assured that all roots within the soil will be effectively cut or destroyed.

By having a tooth 5 positioned directly in advance of each of the hoes 14 and particularly the point or apex thereof it will be assured that the ground will be effectively broken and in a manner whereby choking of the hoes is eliminated. This action is facilitated by having the teeth 8 positioned in a plane extending substantially between the hoes 14.

By having the sections A and B arranged fore and after of the section C, the teeth 5 and 8 serve to maintain the harrow in its entirety and substantially in a level or horizontal position whereby the efficiency of the implement is maintained and particularly as to assure the same extent of penetration of the hoes within the soil.

When the harrow is employed in sandy ground there is a liability of the hoes 14 running too deep and in order to avoid this disadvantage I find it of advantage to interpose between each of the harrow sections A and C and beams 1 an elongated member 15 whereby the hoes 14 are positioned above the lower ends of the teeth 5 and 8, as is particularly illustrated in Figure 5 of the drawings.

From the foregoing description it is thought to be obvious that a harrow constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A harrow comprising parallel beams, draft means associated therewith, a harrow section supported by said beams and extending transversely thereof, shanks depending from said harrow section, substantially horizontally disposed hoes carried by the lower end portions of the shanks, a second harrow section positioned in advance of the first section, and a third harrow section positioned rearwardly of the first section, harrow teeth depending from said second and third named sections, each tooth of the second named section being positioned directly in advance of a hoe of the first section.

2. A harrow comprising parallel beams, draft means associated therewith, a harrow section supported by said beams and extending transversely thereof, shanks depending from said harrow section, substantially horizontally disposed hoes carried by the lower end portions of the shanks, a second harrow section positioned in advance of the first section, and a third harrow section positioned rearwardly of the first section, harrow teeth depending from said second and third named sections, each tooth of the second named section being positioned directly in advance of a hoe of the first section, each of said hoes being V-shaped in form with its apex forwardly directed.

3. A harrow comprising parallel beams, draft means associated therewith, a harrow section supported by said beams and extending transversely thereof, shanks depending from said harrow section, substantially horizontally disposed hoes carried by the lower end portions of the shanks, a second har-section positioned in advance of the first section, and a third harrow section positioned rearwardly of the first section, harrow teeth depending from said second and third named sections, each tooth of the second named section being position directly in advance of a hoe of the first section, said shanks being arranged in two rows, the shanks of one row being staggered with respect to the shanks of the second row.

4. A harrow comprising parallel beams, draft means associated therewith, a harrow section supported by said beams and extending transversely thereof, shanks depending from said harrow section, substantially horizontally disposed hoes carried by the lower end portions of the shanks, a second harrow section positioned in advance of the first section, and a third harrow section positioned rearwardly of the first section, harrow teeth depending from said second and third named sections, each tooth of the second named section being positioned directly in advance of a hoe of the first section, said hoes being substantially coplanar.

In testimony whereof I hereunto affix my signature.

JOHN J. SCHRAG.